Dec. 14, 1948.  R. T. FIELDS  2,456,262

FABRICATION OF POLYTETRAFLUOROETHYLENE ARTICLES

Filed March 29, 1946

INVENTOR.
REUBEN T. FIELDS
BY
*J. M. Castle Jr.*
ATTORNEY

Patented Dec. 14, 1948

2,456,262

UNITED STATES PATENT OFFICE 2,456,262

FABRICATION OF POLYTETRAFLUOROETHYLENE ARTICLES

Reuben T. Fields, Arlington, N. J., assignor to E. I. du Pont de Nemours & Company, Wilmington, Del., a corporation of Delaware Application March 29, 1946, Serial No. 658,186

4 Claims. (Cl. 18—55)

This invention relates to a process for fabricating polytetrafluoroethylene articles and more particularly to a process for fabricating polytetrafluoroethylene articles of complex shape to close dimensional tolerances.

Heretofore it has been found that polytetrafluoroethylene articles may be fabricated by (1) subjecting finely divided polytetrafluoroethylene to pressure to form a shaped body and then heating that shaped body to a temperature above 327° C. to sinter it; and (2) subjecting finely divided polytetrafluoroethylene to pressure to form a shaped body, then heating the body at carefully controlled rates to a temperature not exceeding 500° C. to sinter it and thereafter cooling the body at carefully controlled rates to 250° C. While method (1) works exceedingly well in fabricating articles having a least dimension of about one inch and under, and while method (2) is particularly advantageous in fabricating articles having a least dimension of about one inch and over, difficulties have been encountered with these methods in making articles of complex shape and/or to close dimensional tolerances such as of the order of a few thousandths of an inch. Efforts to produce articles to specifications of this nature by the above two methods have resulted in articles which have not been as a general rule free from flaws.

An object of the present invention is to provide a process of fabricating polytetrafluoroethylene articles of complex shapes which are of uniform density and free from flaws. A further object is to provide a process of fabricating such polytetrafluoroethylene articles which are consistently accurate in size and shape within tolerances of a few thousandths of an inch. Other objects will be apparent in the description of the invention given hereinafter.

The above objects are accomplished according to the present invention by subjecting finely divided polytetrafluoroethylene to pressure to form a shaped body of polytetrafluoroethylene, heating the shaped body at a temperature above 327° C. but not in excess of 500° C. until it is sintered, and cooling the shaped body from said temperature to a temperature below 250° C. under pressure in a die having the shape of the desired finished article.

In practicing this invention the shaped body formed before sintering may be either the shape of the finished article or, more usually, a preform which after sintering is further pressed into the final shape and cooled under pressure to give the desired finished article. Where the shaped body formed before sintering is the shape of the desired finished article, the operation of cooling under pressure maintains this shape and prevents flaws from forming in the article.

Herein the product formed before sintering is referred to as a body and the operation employed therein as preforming. The product formed by cooling under pressure after sintering is referred to as an article and the operation employed therein as afterforming.

In the formation of the shaped body, it is preferred to use a finely divided polytetrafluoroethylene powder which may be obtained conveniently by polymerization of the polytetrafluoroethylene in a violently agitated system, or, alternatively, by subjecting the polymer to a mechanical subdivision step such as micropulverization. The particular method of obtaining the polytetrafluoroethylene in a finely divided form does not constitute a part of the present invention.

The shaped body is preformed preferably by cold pressing the finely divided polytetrafluoroethylene, that is, by pressing at a temperature below 327° C. and usually at atmospheric temperature. The pressure employed in both the preforming and after-forming operations may vary between 50 and 10,000 pounds per square inch, the specific pressure used in any particular instance depending upon the temperature used and the size and shape of the object to be formed. In general, it is preferred that a pressure between 1,000 and 3,000 pounds per square inch be employed.

The process of making various complex articles according to this invention is illustrated in the following examples, reference being made to the accompanying drawings, wherein.

Example I

Figure 2:
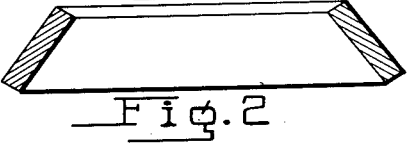
Figure 2 is a section on the line 2—2 of Figure 1.

Polytetrafluoroethylene powder was preformed at 3,000 pounds per square inch in a die into a shaped body having a cross section as shown in Figure 2. The dimensions of the shaped body were:

| | |
|---|---|
| Maximum outside diameter_____inches__ | 8.360 |
| Maximum inside diameter_____do____ | 7.470 |
| Minimum outside diameter_____do____ | 6.880 |
| Minimum inside diameter_____do____ | 5.980 |
| Wall thickness_____do____ | 0.520 |
| Angle of wall to base diameter____degrees__ | 60 |

This preformed shaped body was removed from the die and sintered in a furnace at 360° C. for two hours. Then it was removed from the furnace and immediately placed into a second die (finishing die) and a pressure of 300 pounds per square inch applied to the hot shaped body causing it to assume substantially the size and shape of the second die. This pressure was maintained until the article had cooled to a temperature below 250° C. The articles were characterized by freedom from flaws as determined by X-ray examination, uniform density and uniform size and shape to a few thousandths of an inch.

In contrast to the procedure of Example I given above polytetrafluoroethylene powder was pressed at 3,000 pounds per square inch in the same second die (finishing die) used in Example I thereby forming an object having a cross section as shown in Figure 2. The dimensions of the object were:

| | |
|---|---|
| Maximum outside diameter_____inches__ | 7.822 |
| Maximum inside diameter_____do____ | 7.002 |
| Minimum outside diameter_____do____ | 6.436 |
| Minimum inside diameter_____do____ | 5.626 |
| Wall thickness_____do____ | 0.466 |
| Angle of wall to base diameter___degrees__ | 60 |

The pressed object was removed from the die and sintered in the furnace at 360° C. for two hours. The furnace was shut off and allowed to cool. After eighteen hours the pressed object had cooled to 40° C. Examination of this object revealed that the 60° angle had increased to approximately 70°. The walls had become rough, non-uniform in thickness and cracked.

Example II

Figure 6:
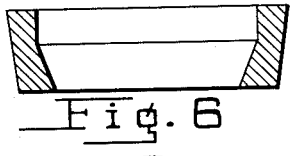
Figure 6 is a section on the line 6—6 of Figure 5.

Polytetrafluoroethylene powder was preformed at 3,000 pounds per square inch in a die into a shaped body having a cross section as shown in Figure 6. The dimensions of the shaped body were:

| | Inches |
|---|---|
| Maximum outside diameter_____ | 4.320 |
| Maximum inside diameter_____ | 3.350 |
| Minimum outside diameter_____ | 4.000 |
| Minimum inside diameter_____ | 2.875 |
| Height (total) _____ | 1.312 |
| Height of internal conical surface_____ | 0.750 |

Figure 3:
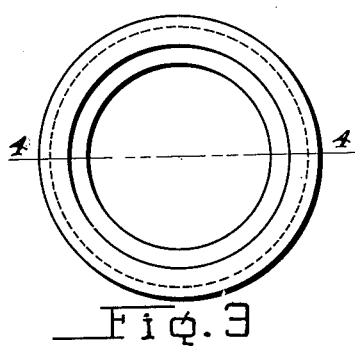
Figure 3 is a plan view of an afterformed article.
Figure 5:
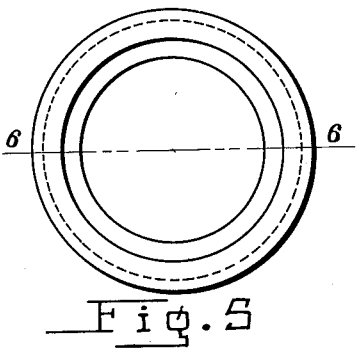
Figure 5 is a plan view of the preformed body for preparing the afterformed article of Figure 3.

The preformed shaped body was removed from the die and sintered in a furnace at 360° C. for two hours. Then it was removed from the furnace and immediately placed into a second die (finishing die) and a pressure of 500 pounds per square inch applied to the hot body causing it to assume substantially the size and shape of this second die. This pressure was maintained until the article had cooled to a temperature below 250° C. The article was removed from the die and cooled by immersion in cold water. The finished article produced according to this procedure had the shape and cross section shown in Figures 3 and 4, respectively. It was free from flaws and otherwise of high quality comparable to those in Example I. Several hundred articles thus fabricated showed a maximum variation in size of less than 0.1%.

Figure 4:
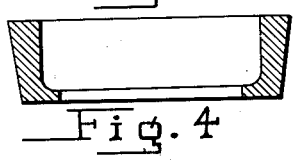
Figure 4 is a section on the line 4—4 of Figure 3.

In contrast to the procedure of Example II given above, polytetrafluoroethylene powder was pressed at 3,000 pounds per square inch in the same second die (finishing die) used in Example II thereby forming an object having a cross section as shown in Figure 4. The dimensions of the object were:

| | Inches |
|---|---|
| Maximum outside diameter _____ | 4.252 |
| Maximum inside diameter_____ | 3.343 |
| Minimum outside diameter_____ | 4.000 |
| Minimum inside diameter_____ | 2.875 |
| Flange thickness _____ | 0.219 |
| Height _____ | 1.312 |

The pressed object was removed from the die and sintered in a furnace at 360° C. for two hours. The furnace was shut off and allowed to cool. After eighteen hours the pressed object had cooled to 40° C. In addition to being otherwise rejectable a continuous crack had formed at the junction of the flange with the wall. This is particularly apt to occur in articles having abrupt changes in the dimensions of the adjacent portions of the article, such as adjacent thick and thin portions.

It will thus be seen from the variations of the procedures of Examples I and II that failure to observe the conditions of the present invention and particularly those in the cooling operation will result in articles undesirable because of flaws, non-uniformity in size and shape and the like. Such difficulty will arise under these circumstances especially in fabricating articles of complex shape and/or to close dimensional tolerances.

Example III

Polytetrafluoroethylene powder was preformed at 2,000 pounds per square inch in a die into a tube-shaped body. The preformed shaped body was sintered in the die in a furnace at 360° C. for two hours under a pressure of 200 pounds per square inch. The preformed body was left in the die and cooled to 100° C. in three hours under a pressure of 200 pounds per square inch. The baked tubular article had the following dimensions:

| | Inches |
|---|---|
| Outside diameter_____ | 1.485 |
| Inside diameter_____ | 0.563 |
| Length _____ | 4.000 |

The tube was free from flaws, uniform in size and shape and density. Dimensional tolerances of a few thousandths of an inch were achieved. The finished tubular article then was removed from the die, further cooled, mounted in a lathe and gaskets cut off the end of the tube. These gaskets are acceptable for use in the industry as such or they may be modified as indicated by the following examples.

Example IV

Figure 7:
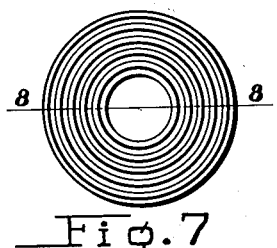
Figure 7 is a plan view of an afterformed serrated gasket article.
Figure 8:
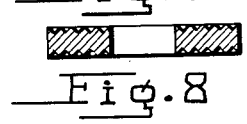
Figure 8 is a section on the line 8—8 of Figure 7.

A gasket 0.125 inch thick was cut from the finished tube of Example III and heated to 225° C. The hot gasket was placed immediately into a serrated die and afterformed in the die by cooling to 100° C. under a pressure of 6,000 pounds per square inch. The finished article had the shape and cross section shown in Figures 7 and 8 respectively. The dimensions of the finished article were:

| | | |
|---|---|---|
| Outside diameter | inches | 1.485 |
| Inside diameter | do | 0.563 |
| Maximum thickness | do | 0.146 |
| Minimum thickness | do | 0.104 |
| Number of peaks per inch of radius | | 12 |
| Angle between sloped surfaces | | 90° |

This modified gasket was free from flaws and showed other good qualities comparable to those of the tube in Example III.

*Example V*

Figure 9:
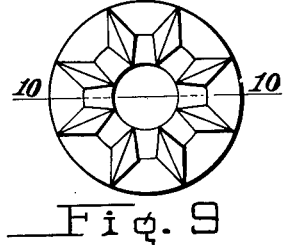
Figure 9 is a plan view of an afterformed modified washer article.
Figure 10:
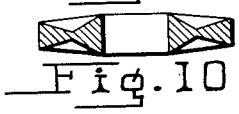
Figure 10 is a section on the line 10—10 of Figure 9.
Figure 1:
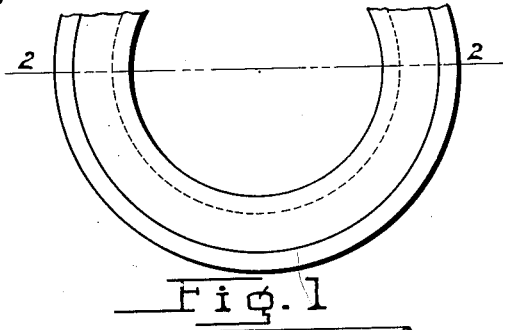
Figure 1 is a plan view of a truncated cone preformed body.

A 0.250 inch washer was cut from the finished tube of Example III and subjected to heating and afterforming as described in Example IV except that a different die was used to produce a finished article having the shape and cross section of Figures 9 and 10 respectively. The dimensions of the finished article were:

| | Inches |
|---|---|
| Outside diameter | 1.485 |
| Inside diameter | 0.563 |
| Thickness at periphery | 0.187 |
| Thickness at center hole | 0.312 |
| Minimum thickness | 0.042 |

The angle of the depressed surfaces with the lateral surfaces of the washer were 60° and 75° at the internal and external cylindrical surfaces respectively. Thus the washer was cold flowed to reduce the thickness at certain points and increase the thickness at other points. The final shape provides greater strength and rigidity than the original shape. The modified washers, although extremely complex in shape, were free from flaws and uniform in size and shape. Dimensional tolerances of a few thousandths of an inch were met. Modified washers thus produced served well as spacers in the manufacture of coaxial cables.

It will be understood that the above examples are illustrative only and that the invention broadly comprises subjecting finely divided polytetrafluoroethylene to pressure to form a shaped body of polytetrafluoroethylene, heating this shaped body at a temperature above 327° C. until sintered, and cooling the shaped body from the temperature used to sinter same to a temperature below 250° C. under pressure in a die having the shape of the desired finished article.

The process of the present invention is applicable both to polytetrafluoroethylene and to mixtures of polytetrafluoroethylene with other components such as finely divided copper, tin, iron, lead, brass, bronze, graphite, asbestos, silica, calcium chloride, calcium fluoride, sodium chloride, ammonium chloride, ammonium nitrate, titanium dioxide or the like. These materials are usually added in powder form although they may be mixed in the form of fibers with the polytetrafluoroethylene where that is more convenient.

The process is also applicable to copolymers of tetrafluoroethylene with other polymerizable compounds such as isobutylene or ethylene and particularly copolymers containing substantial amounts of tetrafluoroethylene although more convenient means may be available for fabricating articles from copolymers, especially those containing a relatively small proportion of tetrafluoroethylene.

The density of the shaped bodies before sintering is normally greater than 1.4 and frequently is in the neighborhood of 1.8 to 2. After sintering and after forming the density is generally between 2 and 2.2 but this will vary depending upon the pressure used in shaping and afterforming the body and the degree of subdivision of the polytetrafluoroethylene.

To sinter the shaped body the temperature must be raised above 327° C. There is no particular advantage in exceeding a temperature of 500° C., more often it is disadvantageous and usually the sintering can be effected more satisfactorily at a considerably lower temperature. The heating operation may be carried out by subjecting the shaped body to a hot atmosphere such as by heating in an electric furnace, a gas furnace or the like, or it may be heated by contact with a liquid such as hot oil, a molten metal or alloy, or a molten mixture of inorganic salts. The use of radiant energy is likewise applicable in this invention.

The present invention is applicable to cold flowing the finished article, such as gaskets or washers cut from a finished tube, in order to produce a second finished article having a different shape as illustrated by Examples IV and V.

An essential operation of this invention is the afterforming step in which the shaped body is made into the finished article by cooling under pressure. The discussion immediately following Examples I and II emphasizes the necessity of cooling under pressure. This is also true in cold flowing portions of the finished article, as disclosed immediately above and in Examples IV and V, into a second finished article having a different shape.

A further application of the tubes produced according to Example III is for making sheets by placing the tubes in a lathe or sheeting machine and turning off a continuous sheet of material. The tubes are well suited for this purpose because they are uniform in size and shape and because there is no waste due to cracks in the tubes. Of course, the tubes may be made in various sizes.

As will be apparent, semi-finished articles may be produced according to this invention and thereafter machined or otherwise treated to give the desired finished articles. Further, the finished articles of the instant invention may be made into more complex shapes or otherwise modified by machining or treating in other ways to give the desired finished articles.

The present invention is applicable broadly to fabricating polytetrafluoroethylene articles although its greatest advantage is in fabricating polytetrafluoroethylene articles having complex shapes and/or close dimensional tolerances, said articles being characterized by freedom from flaws and uniform density. The greatest advantages of this invention are realized more fully in fabricating such articles because the opposite of these desirable properties are more apt to be encountered in this type of articles unless the process of the present invention is employed.

As many apparently widely different embodiments of this invention may be made without departing from the spirit and scope thereof, it is to be understood that the invention is not limited to the specific embodiments thereof except as defined in the appended claims.

I claim:

1. A process of fabricating polytetrafluoroethylene articles which comprises subjecting finely divided polytetrafluoroethylene to a pressure in a die to form a shaped body of polytetrafluoroethylene; releasing the said pressure and removing the shaped body from the die; heating the said shaped body at a temperature above 327° C.

until sintered; and cooling the shaped body from the said temperature to a temperature below 250° C. under pressure in a die having the shape of the desired finished article.

2. A process of fabricating polytetrafluoroethylene articles which comprises subjecting finely divided polytetrafluoroethylene to pressure in a die to form a shaped body of polytetrafluoroethylene; releasing the said pressure and removing the shaped body from the die; heating the said shaped body at a temperature of above 327° C. but not in excess of 500° C. until sintered; and cooling the shaped body from the said temperature to a temperature below 250° C. under pressure in a die having the shape of the desired finished article.

3. A process of fabricating polytetrafluoroethylene articles which comprises subjecting finely divided polytetrafluoroethylene in a die to a pressure of 50 to 10,000 pounds per square inch to form a shaped body of polytetrafluoroethylene; releasing the said pressure and removing the shaped body from the die; heating the said shaped body at a temperature above 327° C. but not in excess of 500° C. until sintered; and cooling the shaped body from the said temperature to a temperature below 250° C. under a pressure of 50 to 10,000 pounds per square inch in a die having the shape of the desired finished article.

4. A process of fabricating polytetrafluoroethylene articles which comprises subjecting finely divided polytetrafluoroethylene in a die to a pressure of 1,000 to 3,000 pounds per square inch to form a shaped body of polytetrafluoroethylene; releasing the said pressure and removing the shaped body from the die; heating the said shaped body at a temperature above 327° C. but not in excess of 500° C. until sintered; and cooling the shaped body from the said temperature to a temperature below 250° C. under a pressure of 1,000 to 3,000 pounds per square inch in a die having the shape of the desired finished article.

REUBEN T. FIELDS.

REFERENCES CITED

The following references are of record in the file of this patent:

UNITED STATES PATENTS

| Number | Name | Date |
| --- | --- | --- |
| 2,224,852 | Lowry | Dec. 17, 1940 |
| 2,232,475 | Renfrew et al. | Feb. 18, 1941 |
| 2,396,629 | Alfthan et al. | Mar. 19, 1946 |